J. J. BATTERMAN.
RUBBER OVERSHOE AND METHOD OF MAKING SAME.
APPLICATION FILED APR. 24, 1917.

1,292,993.

Patented Feb. 4, 1919.
3 SHEETS—SHEET 2.

INVENTOR
John J. Batterman
by Charles W. McDermott
his attorney

UNITED STATES PATENT OFFICE.

JOHN J. BATTERMAN, OF BOSTON, MASSACHUSETTS, ASSIGNOR TO BATTERMAN RUBBER COMPANY, OF BOSTON, MASSACHUSETTS, A CORPORATION OF MASSACHUSETTS.

RUBBER OVERSHOE AND METHOD OF MAKING SAME.

1,292,993.

Specification of Letters Patent.

Patented Feb. 4, 1919.

Application filed April 24, 1917. Serial No. 164,170.

*To all whom it may concern:*

Be it known that I, JOHN J. BATTERMAN, a citizen of the United States, residing at 31 Audobon road, Boston, in the county of Suffolk and State of Massachusetts, have invented certain Improvements in Rubber Overshoes and Methods of Making Same, of which the following description, in connection with the accompanying drawings, is a specification, like reference characters on the drawings indicating like parts in the several figures.

This invention relates to rubber overshoes and is particularly concerned with rubber overshoes of the sandal type; that is, a heelless rubber overshoe which is held on the foot by means of a back-strap or heel strap. Rubber overshoes of this type are sometimes designed to cover the entire forepart of the shoes over which they are worn, but more frequently they are shaped to protect only the sides and toe portions of the forepart leaving a large part of the top of the vamp of the shoes exposed. Sandals of the latter type are designed primarily to be worn over high heeled women's shoes and are known in the trade as "slip-ons" or "foot-holds". The invention will be herein disclosed as embodied in a rubber overshoe of this style.

The present invention has for its general object to effect a substantial economy in the construction and manufacture of rubber overshoes of the sandal type without impairing the wearing qualities of such shoes as made by the present processes.

The usual process of manufacturing a rubber overshoe consists in placing an insole on the bottom of the last on which the shoe is to be made, then stretching the lining, which is always made out of a knit fabric, such as stockinette, over the upper surfaces of the last and securing its marginal portions adhesively to the bottom face of the insole. Usually the lining is coated with a suitable cement before it is placed on the last and later a sheet of gum rubber is stretched over this lining to form the upper of the overshoe. The sole and binder strips are then applied and the shoe finally is vulcanized. After the vulcanizing operation has been performed the vamp is trimmed to its final shape or outline by means of a hand knife. This process, of course, is modified somewhat for different constructions of shoes, but it is substantially the process usually followed in making slip-ons, foot-holds and similar rubber overshoes. It is obvious that there is much waste in making slip-ons or foot-holds by this process since it is necessary to use very much larger pieces of stockinette and rubber for the vamp than are required in the finished shoe.

The present invention provides a rubber overshoe construction of the general type above designated which eliminates a substantial percentage of this waste and it also provides a method of manufacture which reduces the labor involved in making shoes of this type.

The invention will be readily understood from the following description when read in connection with the accompanying drawings, in which.

Figure 1:
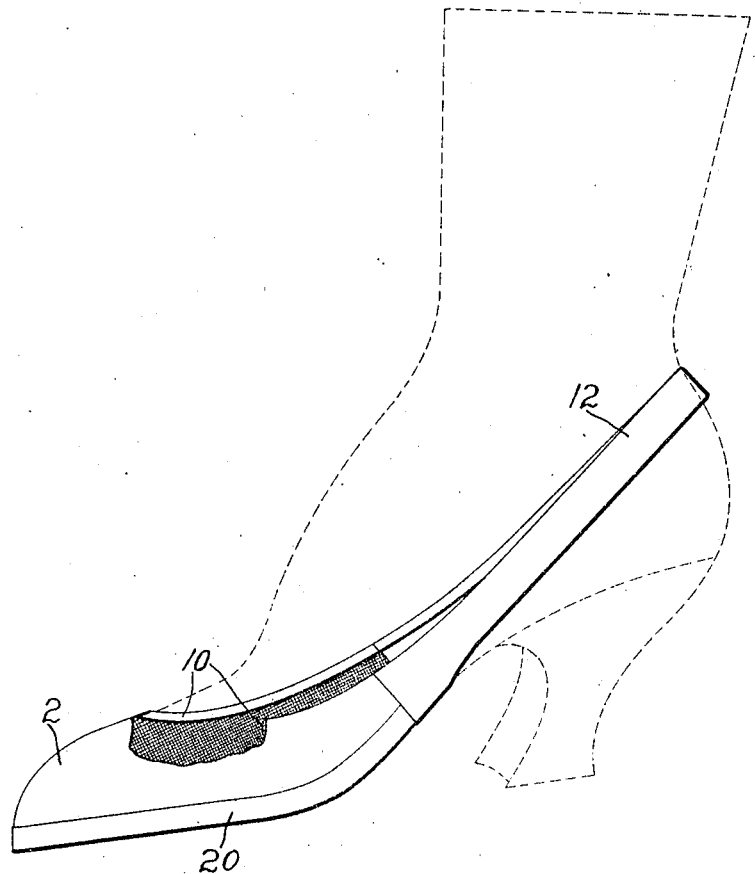
Figure 1 is an angular view of a rubber shoe embodying the invention, a part of the shoe being broken away.
Figure 2:
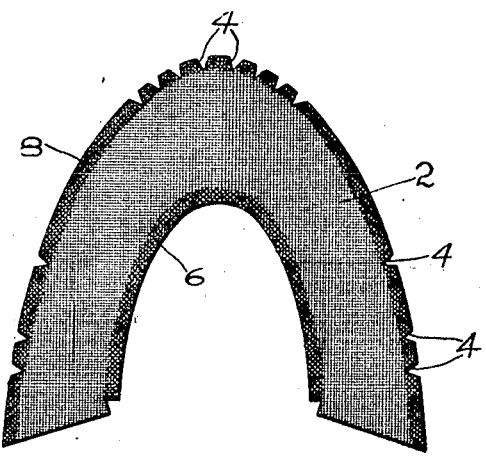
Fig. 2 is a plan view of the vamp used in a shoe of the construction shown in Fig. 1.

The insole, outsole, binder and back strap of the shoe may all be made in accordance with the processes now commonly followed. The vamp, however, instead of consisting of a lining of stockinette over which a sheet of gum rubber is cemented, as in the usual construction, is cut or died out of a rubber coated woven fabric such, for instance, as that widely used in carriage and automobile tops. This vamp is indicated in the drawings at 2 and is died out to the proper size, the dies preferably being constructed to cut notches, such for instance as those indicated at 4, in the margins of the vamp where they will guide the workman in lasting the shoe. The vamp preferably is cut on the straight of the fabric lining. Both the upper and lower margins of the fabric side of the vamp are next coated with a suitable rubber cement, as indicated at 6 and 8, Fig. 2, and the upper marginal edge of the vamp which has been so coated is folded over upon itself with the fabric edge turned inwardly where it will be secured in its folded position by the adhesive previously applied. This step produces a doubled edge along the upper margin of the vamp and avoids the necessity for a separate reinforcing strip which usually is employed in rubber shoes of this type.

Figure 3:
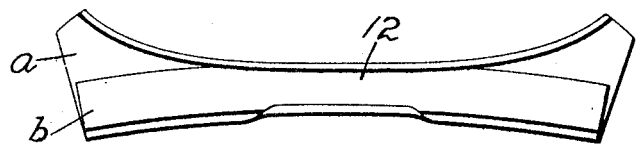
Fig. 3 is a plan view of the back strap for the shoe.
Figure 4:
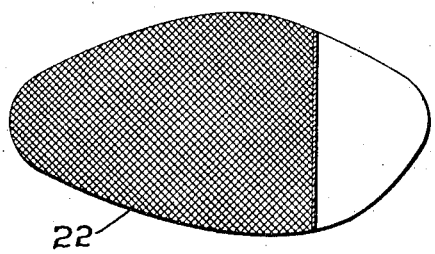
Fig. 4 is a plan view of a sole blank.

The back strap 12 may be made in any convenient manner but in the form shown consists of a blank strip $a$ of rubber reinforced by another rubber strip $b$, the edges of the blank $a$ being folded over to reinforce them. Fig. 3 shows the upper edge turned over in its permanent position and the central portion only of the lower edge folded over.

Figure 5:
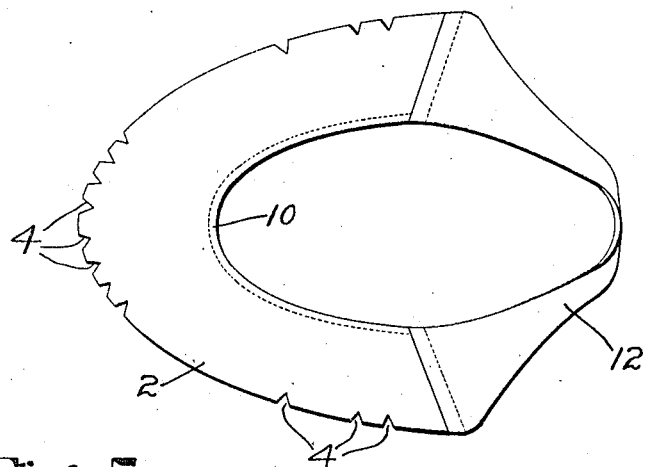
Fig. 5 is a plan view of the vamp and back strap assembled.

In assembling the shoe the ends of the back strap 12 are first secured to the rear ends of the vamp 2, the adhesion between the rubber surfaces of the vamp and back strap usually being sufficient to secure them together. Preferably the ends of the lower edge of the blank $a$ of the back strap are not folded over until after the back strap is secured to the vamp so that these ends may then be turned over the upper corners of the vamp. These parts at this stage of the process, appear substantially as shown in Fig. 5.

Figure 6:
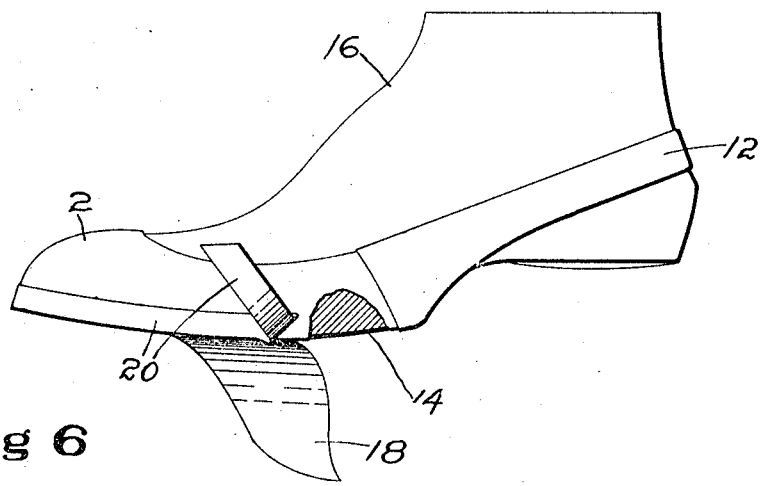
Fig. 6 is a view in side elevation showing certain parts of the shoe assembled on the last.

An insole 14 is next secured to the bottom of a last 16 in any convenient manner, as for instance by tacks. The workman next slips the back strap 12 over the rear end of the last, as shown in Fig. 6, centers the toe portion of the vamp on the toe of the last and pulls it over the edge of the last until the ends of the notches 4 lie just over the edge of the tread face of the insole. The cement on the margin of the vamp secures it to the insole in this position and the operator next folds the sides of the vamp adjacent to its rear ends over the tread face of the last in a similar manner, where the cement secures them in position. This lasting operation is then continued along the sides of the last toward the toe, the notches 4 serving not only to guide the laster in pulling the proper width of the margin of the vamp over the bottom of the last, but also facilitates the neat disposal of this vamp material on the bottom of the last, since the notched construction avoids the presence of many of the puckers and overlaps that otherwise would be present. In this connection it should be noted that in lasting the vamp in this manner very little distortion of the woven fabric lining is required at the central part of the toe and the rear portions of the vamp where the pull due to the lasting operations comes on the straight of the goods, that is, longitudinally of the warp or weft threads; but that the maximum distortion of the fabric comes at each side of the central part of the toe and is directed along lines that extend diagonally to both the warp and weft threads of the fabric. In other words, this pull is directed on the bias with reference to the fabric and the fabric thus is enabled to stretch sufficiently to produce a smoothly lasted toe.

The lasting operation having been completed and the overdrawn margin of the vamp having been secured to the insole, the rag sole 18, (if one is used), next is secured to the bottom of the insole; the binder strip 20 then is applied, and finally the outsole 22 is secured in place. These parts are all secured on the last by the adhesiveness of the rubber, which at this time is in a green condition, or by the use of suitable adhesives. The shoe next is given a coat of varnish or finish and is then vulcanized.

As above stated, it has been considered essential heretofore to use a stockinette lining, both in order to enable a workman to last the shoe smoothly, and also for the purpose of providing in the upper the required amount of elasticity. It is impractical to coat stockinette in sheet form with rubber, because of its peculiar elasticity, and it has therefore been necessary to secure the stockinette in the proper position on the last, and then to secure the gum coat of rubber to the stockinette while on the last. After the shoe is vulcanized the vamp is trimmed to the desired outline. It is obvious that the process provided by this invention effects a saving over the former practice by eliminating the necessity for coating the entire surface of the stockinette with adhesive, in reducing the labor of the lasting operation and in eliminating the trimming of the vamp after the shoe is otherwise completed. This construction also effects a saving in materials since the vamps can be died out of the rubber coated woven fabric very closely, thus materially reducing the waste in the goods from which the vamps are made. The turning over of the upper margin of the vamp, as indicated at 10, not only reinforces this edge without requiring a separate reinforcing or finishing strip, as in former constructions, but it forms a much stronger edge than does the usual reinforcing strip. The rubber coated woven fabric is also cheaper, for the same grade of rubber coating, than is the stockinette lining with a separate gum sheet secured to it. This rubber coating of a woven fabric usually is effected by machinery which includes a calender that forces the rubber coat firmly into contact with the fabric and the use of a vamp cut out of this material eliminates any possibility of defects which frequently occur in the present methods due to a failure to form a good union between the stockinette lining and the gum rubber coat. It is obvious that these advantages are produced primarily by cutting the vamp out of a sheet of rubber coated woven fabric, and I believe I am the first to devise a rubber overshoe of the general type above indicated in which a vamp made of this material has been successfully employed.

What is claimed as new is:

1. A rubber overshoe of the sandal type having a vamp consisting of a rubber coated woven fabric, the vamp being cut on the straight of the fabric and the upper marginal portion of said vamp being folded over on itself.

2. A heel-less rubber overshoe of the sandal type having a narrow vamp consisting of a rubber coated woven fabric, the upper edge portion of said vamp being folded over upon itself, and a back strap secured to the rear ends of said vamp.

3. A heel-less rubber overshoe having a vamp consisting of a rubber coated woven fabric, the upper marginal portion of said vamp being folded over upon itself, a sole extending from the toe of the shoe to a point in the hollow of the arch, and a back-strap joining the rear ends of said vamp and designed to extend around the counter of a shoe.

4. That improvement in the process of manufacturing rubber overshoes of the sandal type which consists in cutting a vamp out of a rubber coated woven fabric, assembling the vamp with the other parts of the shoe on a last and vulcanizing the shoe.

5. That improvement in the process of manufacturing rubber overshoes of the sandal type which consists in cutting a vamp out of a rubber coated woven fabric, securing the ends of the back-strap to the rear ends of the vamp, next lasting the vamp to an insole with the vamp, insole and back-strap supported on a last, and then completing the making and vulcanizing operations in the usual manner.

6. That improvement in the process of manufacturing rubber overshoes of the sandal type which consists in cutting a vamp out of a rubber coated woven fabric, coating margin portions of the fabric face of said vamp with adhesive material, folding over the upper marginal edge of the vamp and adhesively securing it in its folded position, adhesively securing together the vamp and the other parts of the shoe on a last, and vulcanizing the shoe.

7. That improvement in the process of manufacturing rubber overshoes of the sandal type which consists in cutting a vamp out of a rubber coated woven fabric with the vamp lying on the straight of the fabric, providing the vamp with marginal notches designed to facilitate the lasting operation, adhesively securing together the vamp and the other parts of the shoe on a last, and vulcanizing the shoe.

In testimony whereof I have signed my name to this specification.

JOHN J. BATTERMAN.